United States Patent
de Brouwer et al.

(10) Patent No.: US 8,962,770 B2
(45) Date of Patent: *Feb. 24, 2015

(54) BLENDS OF ISOSORBIDE-BASED COPOLYCARBONATE, METHOD OF MAKING, AND ARTICLES FORMED THEREFROM

(75) Inventors: Hans de Brouwer, Oisterwijk (NL); Robert Dirk van de Grampel, Tholen (NL); Jan Henk Kamps, Bergen op Zoom (NL); Jan Pleun Lens, Rotterdam (NL)

(73) Assignee: Sabic Global Technologies B.V. (NL)

( * ) Notice: Subject to any disclaimer, the term of this patent is extended or adjusted under 35 U.S.C. 154(b) by 635 days.

This patent is subject to a terminal disclaimer.

(21) Appl. No.: 12/893,479

(22) Filed: Sep. 29, 2010

(65) Prior Publication Data

US 2011/0160406 A1    Jun. 30, 2011

Related U.S. Application Data

(60) Provisional application No. 61/291,197, filed on Dec. 30, 2009.

(51) Int. Cl.
| | |
|---|---|
| *C08L 69/00* | (2006.01) |
| *C08G 64/02* | (2006.01) |
| *C08G 64/16* | (2006.01) |
| *C08G 64/18* | (2006.01) |
| *C08L 83/10* | (2006.01) |

(52) U.S. Cl.
CPC .............. *C08L 69/00* (2013.01); *C08G 64/0266* (2013.01); *C08G 64/1666* (2013.01); *C08G 64/186* (2013.01); *C08L 83/10* (2013.01); *C08L 2205/02* (2013.01)
USPC ............... 525/439; 525/464; 528/26; 528/27; 528/29

(58) Field of Classification Search
None
See application file for complete search history.

(56) References Cited

U.S. PATENT DOCUMENTS

| | | | |
|---|---|---|---|
| 4,506,066 | A | 3/1985 | Medem et al. |
| 6,103,837 | A | 8/2000 | Hiiro et al. |
| 6,486,294 | B1 | 11/2002 | Brack et al. |
| 6,600,004 | B1 | 7/2003 | McCloskey et al. |
| 7,041,775 | B2 | 5/2006 | Martinez et al. |
| 7,138,479 | B2 | 11/2006 | Dhara et al. |
| 7,666,872 | B2 | 2/2010 | Dunkern et al. |
| 7,786,246 | B2 * | 8/2010 | Jansen et al. ........... 528/196 |
| 2005/0143549 | A1 | 6/2005 | Schijndel et al. |
| 2005/0143554 | A1 | 6/2005 | Dhara et al. |
| 2006/0002814 | A1 | 1/2006 | Chatterjee et al. |
| 2006/0149024 | A1 | 7/2006 | Ono et al. |
| 2008/0015331 | A1 | 1/2008 | Terado et al. |
| 2008/0230751 | A1 | 9/2008 | Li et al. |
| 2008/0269386 | A1 | 10/2008 | Chakravarti et al. |
| 2009/0105393 | A1 | 4/2009 | Jansen et al. |
| 2009/0105443 | A1 | 4/2009 | Brack et al. |
| 2009/0105444 | A1 | 4/2009 | Chatterjee et al. |
| 2009/0312503 | A1 | 12/2009 | Brack et al. |
| 2010/0076130 | A1 * | 3/2010 | Miyake et al. ............ 524/120 |
| 2010/0099832 | A1 | 4/2010 | Jansen et al. |
| 2011/0160406 | A1 | 6/2011 | de Brouwer et al. |
| 2011/0160408 | A1 * | 6/2011 | de Brouwer et al. ....... 525/450 |
| 2011/0160422 | A1 | 6/2011 | Kamps et al. |

FOREIGN PATENT DOCUMENTS

| | | | |
|---|---|---|---|
| EP | 0524731 | A1 | 1/1993 |
| EP | 2033981 | A1 | 3/2009 |
| EP | 2053072 | A1 | 4/2009 |
| GB | 1079686 | | 8/1967 |
| JP | 200467990 | A | 3/2004 |
| JP | 2005132872 | A | 5/2005 |
| JP | 2006232897 | A | 9/2006 |
| JP | 2008291053 | * | 12/2008 |
| JP | 2009063976 | A | 3/2009 |
| JP | 2009144013 | A | 7/2009 |
| JP | 2009191226 | A | 8/2009 |
| WO | 0210111 | A1 | 2/2002 |
| WO | 2005116110 | A1 | 12/2005 |
| WO | 2006036545 | A1 | 4/2006 |
| WO | 2008020636 | A1 | 2/2008 |
| WO | WO 2008/133342 | * | 11/2008 |

OTHER PUBLICATIONS

Kroschwitz, Concise Encyclopedia of Polymer Science and Engineering; 1990 pp. 779-781.*
Japanese Publication No. 2009144013, Published Jul. 2, 2009, Abstract Only, 1 page.
Japanese Publication No. 2009191226, Published Aug. 27, 2009, Abstract Only, 1 page.
Japanese Publication No. 2004067990; Publication Date: Mar. 4, 2004; Abstract Only; 1 page.
International Publication No. 2005116110; Publication Date: Dec. 8, 2005; Abstract Only, 1 page.
Japanese Patent No. 2005132872 (A); Publication Date: May 26, 2005; Machine Translation; 9 Pages.
Japanese Publication No. 2006232897; Publication Date: Sep. 7, 2006; Abstract Only; 2 Pages.

(Continued)

*Primary Examiner* — David Buttner
(74) *Attorney, Agent, or Firm* — Cantor Colburn LLP

(57) ABSTRACT

Disclosed herein is are thermoplastic compositions comprising a blend of a homopolycarbonate comprising units derived from an aromatic dihydroxy compound and a copolymer comprising isosorbide units and siloxane units. The copolymer comprising isosorbide units and siloxane units can further comprise non-isosorbide aliphatic units derived from a $C_{14-44}$ aliphatic diacid, a $C_{14-44}$ aliphatic diol or combination of these, aromatic units, aliphatic units derived from an oligomer having a weight average molecular weight of 900 to 4000 or a combination of some or all of the foregoing additional units.

21 Claims, No Drawings

(56) References Cited

OTHER PUBLICATIONS

International Publication No. 2008020636 (A1); Publication Date: Feb. 21, 2008; Abstract Only; 1 page.

Japanese Publication No. 2009063976; Publication Date: Mar. 26, 2009; Abstract Only, 1 page.

Betiku et al.; "Synthesis and Characterization of Isosorbide Carbonate: Lactide Copolymers"; Polymer Preprints (American Chemical Society, Division of Polymer Chemistry); vol. 48, Issue 2; 2007; pp. 802-803; Abstract Only; Document No. XP002529896.

Braun, et al.; Polyesters with 1.4:3.8-dianhydrosobritol as Polymeric Plasticizers for PVC; Die Angewandte Makromolekulare Chemie; vol. 199; 1992; pp. 191-205.

Kambour et al.; "Tough, Transparent Heat- and Flame-Resistant Thermoplastics via Silicone Block-Modified Bisphenol Fluorenone Polycarbonate"; Journal of Applied Polymer Science; vol. 20; 1976; pp. 3275-3293.

Kricheldorf et al.; "Polymers of Carbonic Acid. 22. Cholesteric Polycarbonates Derived from (S)-((2-Methylbutyl)thio)hydroquinone or Isosorbide"; Macromolecules; vol. 29; 1996; pp. 8077-8082.

International Search Report; International Application No. PCT/US2010/062302; International Filing Date: Dec. 29, 2010; Date of Mailing: Mar. 24, 2011; 4 Pages.

Written Opinion of the International Searching Authority; International Application No. PCT/US2010/062302; International Filing Date: Dec. 29, 2010; Date of Mailing: Mar. 24, 2011; 4 Pages.

"Synthesis and characterization of isosorbide carbonate: lactide copolymers"; XP002529896, 2007; 2 pages.

\* cited by examiner

BLENDS OF ISOSORBIDE-BASED COPOLYCARBONATE, METHOD OF MAKING, AND ARTICLES FORMED THEREFROM

CROSS REFERENCE TO RELATED APPLICATIONS

This application claims the benefit of U.S. Provisional Patent Application No. 61/291,197 filed on Dec. 30, 2009, which is incorporated by reference herein in its entirety.

BACKGROUND

This disclosure relates to blends comprising isosorbide-based polycarbonate, and methods of manufacture thereof.

Polymers based on aliphatic diols derived from biologically-based sources are of great interest to the plastics industry and to the manufacturing industry, for the preparation of materials and products that can be derived from inexpensive, renewable sources and that also may be biodegradable, and thereby have a low net environmental impact. Of particular interest are polymers based on isosorbides, and more specifically referred to as 2,6-dioxabicyclo[3.3.0]octan-4,8-diol, 1,4:3,6-dianhydro-D-glucitol, and 2,3,3a,5,6,6a-hexahydrofuro[3,2-b]furan-3,6-diol, and isomers of these. These materials are of great interest to the chemical industry, and in particular in the production of polymeric materials such as polycarbonates, because such aliphatic diols can be produced from renewable resources, namely sugars, rather than from the petroleum feed stocks used to prepare other monomers useful in the production of polycarbonates, such as bisphenol monomers.

However, for practical applications, polycarbonate incorporating isosorbide needs a balance of properties to be useful. A problem that accompanies inclusion of such biologically derived materials in polycarbonates is maintaining the desired mechanical and optical properties of the polycarbonate during and after high temperature processing, such as encountered during extrusion and molding. Polycarbonate that include isosorbide that otherwise have desirable properties can have insufficient impact and heat resistance properties.

There accordingly remains a need in the art for a composition comprising an isosorbide-based polycarbonate, wherein the composition has sufficiently high heat resistance and impact performance.

BRIEF DESCRIPTION

Described herein are thermoplastic compositions comprising a blend of a homopolycarbonate comprising units derived from an aromatic dihydroxy compound and a copolycarbonate comprising isosorbide units and siloxane units. The copolycarbonate comprising isosorbide units and siloxane units can further comprise non-isosorbide aliphatic units derived from a $C_{14-44}$ aliphatic diacid, a $C_{14-44}$ aliphatic diol or combination of these, aromatic units, aliphatic units derived from an oligomer having a weight average molecular weight of 900 to 4000 or a combination of some or all of the foregoing additional units.

DETAILED DESCRIPTION

The thermoplastic composition comprises a blend of a homopolycarbonate and an isosorbide-based copolycarbonate. Isosorbide-based copolycarbonates as described herein include polyester-polycarbonates. The isosorbide-based copolycarbonates and polyester-polycarbonates comprise units derived from isosorbide, units derived from polysiloxane and optionally aliphatic units derived from an aliphatic oligomer having a molecular weight of 900 to 4000. The thermoplastic compositions have surprisingly high impact strength without a substantial decrease in heat resistance. Heat resistance is evaluated by a combination of glass transition temperature, heat deformation temperature and Vicat data. Impact resistance is evaluated by Notched Izod data. These physical properties and methods of determining them are discussed in greater detail below.

The homopolycarbonate has repeating structural carbonate units of the formula

wherein the $R^2$ groups are derived from aromatic dihydroxy compounds. The aromatic dihydroxy compounds can have the formula (3):

$$HO-A^1-Y^1-A^2-OH \qquad (3)$$

wherein each of $A^1$ and $A^2$ is a monocyclic divalent arylene group, and $Y^1$ is a single bond or a bridging group having one or two atoms that separate $A^1$ from $A^2$. In an exemplary embodiment, one atom separates $A^1$ from $A^2$. In another embodiment, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene, or isopropylidene.

Included within the scope of formula (3) are bisphenol compounds of general formula (4):

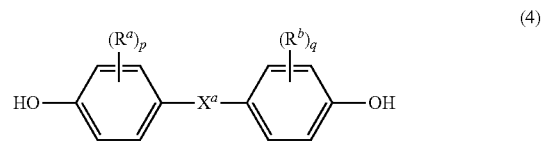

wherein $R^a$ and $R^b$ each represent a halogen atom or a monovalent hydrocarbon group and can be the same or different; p and q are each independently integers of 0 to 4; and $X^a$ represents a single bond or one of the groups of formulas (5a) or (5b):

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{1-12}$ heteroarylalkyl, and $R^e$ is a divalent $C_{1-12}$ hydrocarbon group. In particular, $R^c$ and $R^d$ are each the same hydrogen or $C_{1-4}$ alkyl group, specifically the same $C_{1-3}$ alkyl group, even more specifically, methyl.

In an embodiment, $R^c$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

In a specific exemplary embodiment, $X^a$ is a substituted $C_{3-18}$ cycloalkylidene of the formula (6):

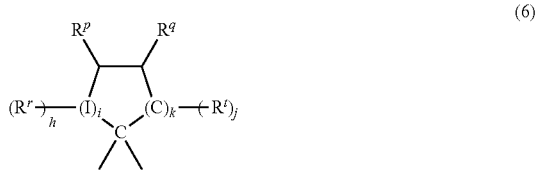

(6)

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (6) will have an unsaturated carbon-carbon linkage where the ring is fused. When k is 1 and i is 0, the ring as shown in formula (6) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are used, for example bisphenols of formula (7):

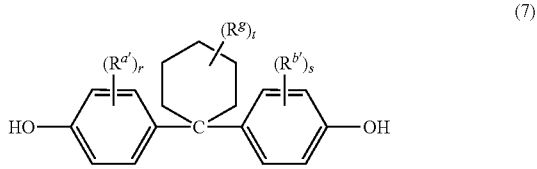

(7)

wherein substituents $R^{a'}$ and $R^{b'}$ can be aliphatic or aromatic, straight chain, cyclic, bicyclic, branched, saturated, or unsaturated, and $R^g$ is $C_{1-12}$ alkyl or halogen, r and s are independently integers from 0 to 4, and t is an integer of 0 to 10. It will be understood that hydrogen fills each valency when r is 0, s is 0, and t is 0. In one embodiment, each $R^{a'}$ and $R^{b'}$ is independently $C_{1-12}$ alkyl. In a specific embodiment, where r and/or s is 1 or greater, at least one of each of $R^{a'}$ and $R^{b'}$ are disposed meta to the cyclohexylidene bridging group. The substituents $R^{a'}$, $R^{b'}$, and $R^g$ may, when comprising an appropriate number of carbon atoms, be straight chain, cyclic, bicyclic, branched, saturated, or unsaturated. In a specific embodiment, $R^{a'}$, $R^{b'}$, and $R^g$ are each $C_{1-4}$ alkyl, specifically methyl. In still another embodiment, $R^{a'}$, $R^{b'}$, and $R^g$ is a $C_{1-3}$ alkyl, specifically methyl, r and s are 0 or 1, and t is 0 to 5, specifically 0 to 3. Useful cyclohexane-containing bisphenols of formula (7) where t is 3, r and s are 0, and $R^g$ is methyl include, for example those derived from the reaction product of two moles of a phenol with one mole of a hydrogenated isophorone such as e.g., 3,3,5-trimethylcyclohexanone, are useful for making polycarbonate polymers with high glass transition temperatures and high heat distortion temperatures. Such isophorone-bridged, bisphenol-containing polycarbonates, or a combination comprising at least one of the foregoing with other bisphenol polycarbonates, can be obtained from Bayer Co. under the APEC® trade name.

Some illustrative, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Specific examples of the types of bisphenol compounds represented by formula (3) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)

octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene.

Other types of diols can be used making the homopolycarbonate. For example, a $R^2$ can also be further derived from a dihydroxy aromatic compound of formula (8):

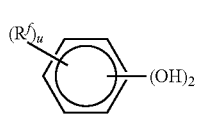

(8)

wherein each $R^f$ is independently $C_{1-12}$ alkyl, or halogen, and u is 0 to 4. It will be understood that $R^f$ is hydrogen when u is 0. Typically, the halogen can be chlorine or bromine. In an embodiment, compounds of formula (8) in which the —OH groups are substituted meta to one another, and wherein $R^f$ and u are as described above, are also generally referred to herein as resorcinols. Examples of compounds that can be represented by the formula (8) include resorcinol (where u is 0), substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Various types of polycarbonates with branching groups are also contemplated as being useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

The homopolycarbonate can be present in an amount of 10 to 80 weight percent (wt %), specifically 20 to 70 wt %, and more specifically 25 to 65 wt %, based on the total weight of composition.

Isosorbide-based copolycarbonates have repeating structural carbonate units of the formula (1):

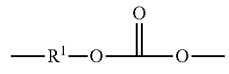

(1)

wherein the $R^1$ groups comprise groups that are derived from isosorbide and siloxane containing dihydroxy compounds.

The isosorbide-based carbonate units are shown in formula (2):

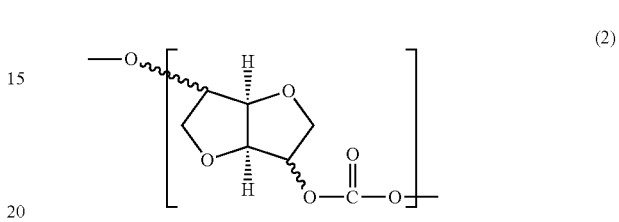

(2)

The isosorbide-based carbonate units of formula (2) can be derived from a mixture of isomers of isosorbide or from individual isomers of isosorbide. The stereochemistry for the isosorbide-based carbonate units of formula (2a) is not particularly limited. Specifically, isosorbide has the general formula (2a):

(2a)

and can be a single diol isomer or mixture of diol isomers. The stereochemistry for the isosorbide of general formula (2a) is also not particularly limited. These diols are prepared by the dehydration of the corresponding hexitols. Hexitols are produced commercially from the corresponding sugars (aldohexose). Aliphatic diols of formula (2a) include 1,4:3,6-dianhydro-D glucitol, of formula (2b); 1,4:3,6-dianhydro-D mannitol, of formula (2c); and 1,4:3,6-dianhydro-L iditol, of formula (2d), and combinations of two or more of the aforementioned diols. Isosorbide isomers are available commercially from various chemical suppliers including Cargill, Roquette, and Shanxi.

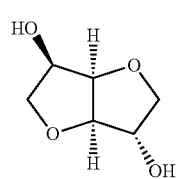

(2b)

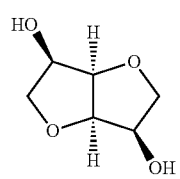

(2c)

-continued (2d)

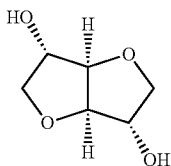

In a specific embodiment, the diol of the formula (2b) is desirable because it is a rigid, chemically and thermally stable aliphatic diol that can be used to produce higher Tg copolymers than the other diols of formulas (2c) and (2d).

The isosorbide units can be present in an amount of 50 to 95 wt %, specifically 60 to 95 wt %, and more specifically 70 to 95 wt % based on the total weight of diol and diacid used to make the polycarbonate.

The polysiloxane units are derived from a siloxane-containing dihydroxy compound (also referred to herein as "hydroxyaryl end-capped polysiloxanes") that comprises diorganosiloxane units blocks of formula (15):

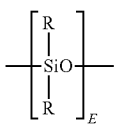

(15)

wherein each occurrence of R is same or different, and is a $C_{1-13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. Where a transparent isosorbide-based polycarbonate is desired, R does not contain any halogen. Combinations of the foregoing R groups can be used in the same isosorbide-based polycarbonate.

The value of E in formula (15) can vary widely depending on the type and relative amount of each of the different units in the isosorbide-based polycarbonate, the desired properties of the isosorbide-based polycarbonate, and like considerations. Generally, E can have an average value of about 2 to about 1,000, specifically about 2 to about 500, more specifically about 2 to about 100. In an embodiment, E has an average value of about 4 to about 90, specifically about 5 to about 80, and more specifically about 10 to about 70. Where E is of a lower value, e.g., less than about 40, it can be desirable to use a relatively larger amount of the units containing the polysiloxane. Conversely, where E is of a higher value, e.g., greater than about 40, it can be desirable to use a relatively lower amount of the units containing the polysiloxane.

The polysiloxane blocks can be provided by repeating structural units of formula (16):

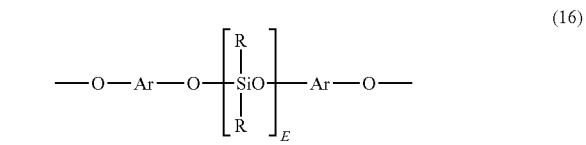

(16)

wherein E is as defined above; each R is the same or different, and is as defined above; and each Ar is the same or different, and is a substituted or unsubstituted $C_6$-$C_{30}$ arylene group, wherein the bonds are directly connected to an aromatic moiety. Ar groups in formula (16) can be derived from a $C_6$-$C_{30}$ dihydroxyaromatic compound, for example a dihydroxyaromatic compound of formula (4) or (8) described in detail below. Combinations comprising at least one of the foregoing dihydroxyaromatic compounds can also be used. Exemplary dihydroxyaromatic compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl) n-butane, 2,2-bis(4-hydroxy-1-methylphenyl)propane, 1,1-bis(4-hydroxyphenyl)cyclohexane, bis(4-hydroxyphenyl sulfide), 1,1-bis(4-hydroxy-3-methylphenyl)cyclohexane, and 1,1-bis(4-hydroxy-t-butylphenyl)propane, or a combination comprising at least one of the foregoing dihydroxy compounds.

Polycarbonates comprising such units can be derived from the corresponding dihydroxy compound of formula (16a):

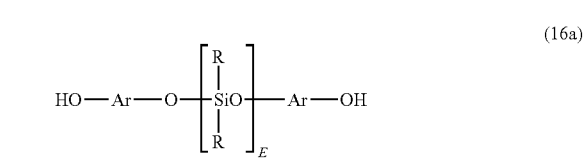

(16a)

wherein Ar and E are as described above. Compounds of formula (12a) can be obtained by the reaction of a dihydroxyaromatic compound with, for example, an alpha, omega-bis-acetoxy-polydiorganosiloxane oligomer under phase transfer conditions. Compounds of formula (12a) can also be obtained from the condensation product of a dihydroxyaromatic compound, with, for example, an alpha, omega bis-chloro-polydimethylsiloxane oligomer in the presence of an acid scavenger.

In another embodiment, polydiorganosiloxane blocks comprises units of formula (17):

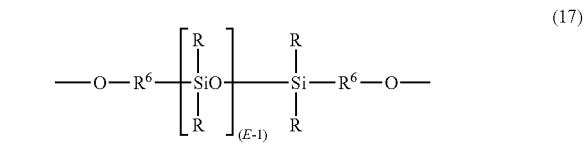

(17)

wherein R and E are as described above, and each $R^6$ is independently a divalent $C_1$-$C_{30}$ organic group, and wherein the oligomerized polysiloxane unit is the reaction residue of its corresponding dihydroxy compound. The polysiloxane blocks corresponding to formula (17) are derived from the corresponding dihydroxy compound of formula (17a):

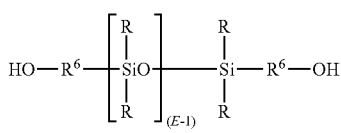

(17a)

wherein R and E and $R^6$ are as described for formula (17).

The polydiorganosiloxane blocks can be provided by repeating structural units of formula (18):

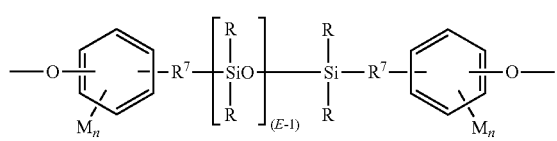

(18)

wherein R and E are as defined above. $R^7$ in formula (18) is a divalent $C_2$-$C_8$ aliphatic group. Each nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4. M in formula (18) can be the same or different, and is a halogen, cyano, bromo, or chloro, an alkyl group such as methyl, ethyl, or propyl, an alkoxy group such as methoxy, ethoxy, or propoxy, or an aryl group such as phenyl, chlorophenyl, or tolyl.

In an exemplary combination, M can be bromo or chloro, an alkyl group such as methyl, ethyl, or propyl, an alkoxy group such as methoxy, ethoxy, or propoxy, or an aryl group such as phenyl, chlorophenyl, or tolyl; $R^7$ can be a dimethylene, trimethylene or tetramethylene group; and R can be a $C_{1-8}$ alkyl, haloalkyl such as trifluoropropyl, cyanoalkyl, or aryl such as phenyl, chlorophenyl or tolyl. R can be methyl, or a combination of methyl and trifluoropropyl, or a combination of methyl and phenyl. M can be methoxy, n can be one, $R^7$ can be a divalent $C_1$-$C_3$ aliphatic group, and R can be methyl.

Polysiloxane-polycarbonates comprising units of formula (18) can be derived from the corresponding dihydroxy polydiorganosiloxane (18a):

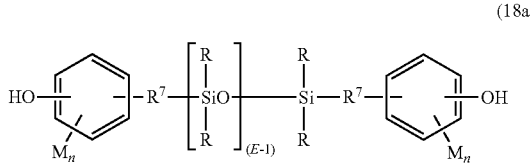

(18a)

wherein each of R, E, M, $R^7$, and n are as described above. Such dihydroxy polysiloxanes can be made by effecting a platinum-catalyzed addition between a siloxane hydride of formula (19):

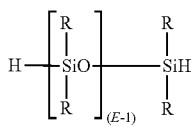

(19)

wherein R and E are as previously defined, and an aliphatically unsaturated monohydric phenol. Exemplary aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 4-allylphenol, and 2-allyl-4,6-dimethylphenol. Combinations comprising at least one of the foregoing can also be used.

The polysiloxane units can be present in an amount of 3 to 30 wt %, specifically 4 to 25 wt %, and more specifically 5 to 15 wt % based on the total weight of diol and diacid used to make the polycarbonate.

The isosorbide-based polycarbonate may further comprise aliphatic units that are derived from aliphatic oligomers having a weight average molecular weight of 900 to 4000, or, specifically 900 to 3000, or more specifically, 900 to 2500. The aliphatic oligomers can comprise repeating units derived from aliphatic fatty acids. The aliphatic oligomers may be acid terminated which results in ester linkages or hydroxyl terminated which results in carbonate linkages.

The aliphatic oligomers may be linear or branched, difunctional alkylene or alkenylene compounds are derived from a monomer having the basic formula (10):

$$X\text{-}L\text{-}X \qquad (10)$$

wherein X represents a carboxylic acid (—C(O)OH) or a methylol group (CH2-OH). L represents a group having greater than or equal to 60 carbon atoms. L may also include cyclic carbon substructures, specifically monocyclic, polycyclic, or fused polycyclic groups.

The aliphatic oligomers can be synthesized by the addition reaction of two or more unsaturated aliphatic acids. "Unsaturated", as used herein, can mean monounsaturated, diunsaturated, triunsaturated, polyunsaturated, or a combination of at least one of the foregoing. It will be understood that for unsaturated sites in the aliphatic diacid, the cis isomer, trans isomer, or a combination of cis and trans isomers can be present within reactant unsaturated aliphatic acid (such as where a single aliphatic diacid can have at least one each of a cis and trans isomerized double bond), or different isomers of unsaturated aliphatic acids may be combined (such as where a combination of a trans aliphatic acid and a cis aliphatic acid is used).

Reaction of two unsaturated aliphatic acids can be accomplished by a carbon-carbon bond forming reaction between unsaturated sites in different unsaturated aliphatic acids, and can result in formation of a single bond, multiple single bonds (where an at least diunsaturated aliphatic monomer is used), cyclodimerization to form a bridging carbocycle, or other such carbon-carbon bonding between the unsaturated aliphatic acids. It will be understood that such reactions can produce a mixture of products and isomers, and that all such combinations of products and isomers are contemplated herewith. The reaction between unsaturated diacids may be accomplished by radical initiation, metal catalysis, photoinitiation, acid catalysis, or any suitable method. In an embodiment, the reaction of unsaturated aliphatic acids to form aliphatic oligomeric polyester polyol can be effected by use of a catalytic inorganic material including a clay having catalytic properties such as montmorillonite. It is also possible that the aliphatic oligomeric polyester polyol can be derived from the condensation of two shorter chain unsaturated aliphatic acids such as, for example, acrylic acid, methacrylic acid, crotonic acid, or the like, with one or more unsaturated compounds that do not have acid groups. It is desirable that the oligomer is derived from plant based biological sources (such as e.g., vegetable oils), but may also be preparable from other commercially available feedstocks such as petroleum derivatives, coal extracts, animal sources, other plant sources such as timber, and the like, and so should not be considered as limited to vegetable or crop sources. Aliphatic oligomers derived from natural sources are available commercially from chemical suppliers including Uniqema, Cognis, and Oleon.

The aliphatic oligomers can also be synthesized by coupling, through a condensation reaction such as an esterification reaction, two or more fatty acids where at least one fatty acid is functionalized. Exemplary linkages between fatty acids include ester linkages and ether linkages. The oligomeric polyester polyol can comprise polyester dimers of $C_{30-45}$ aliphatic diacids, polyester trimers of $C_{30-45}$ aliphatic diacids and combinations of dimers and trimers of $C_{30-45}$ aliphatic diacids, The aliphatic units derived from an aliphatic oligomer can be present in an amount of 5 to 20 weight percent, specifically 6 to 15 weight percent, based on the total weight of dihydroxy compound, polyol and diacid used to make the polycarbonate.

The isosorbide-based polycarbonate may further comprise non-isosorbide aliphatic units derived from a $C_{14-44}$ aliphatic diacid, a $C_{14-44}$ aliphatic diol or combination of these are described in U.S. Patent Publication No. 20090105393, which is incorporated by reference herein in its entirety. This patent publication discloses the $C_{14-44}$ aliphatic diacid or $C_{14-44}$ aliphatic diol is each linear or branched, difunctional alkylene or alkenylene compounds have the basic formula:

Y—(V)—Y wherein each Y represents a carboxylic acid (—C(O)OH) or methylol (—CH$_2$OH) functional group (where each comprises a single carbon atom). In an embodiment, each Y is the same. V represents a linking group of greater than 11 carbon atoms. More specifically, V is a branched $C_{12-42}$ alkylene or $C_{12-42}$ alkenylene group. V may also include cyclic carbon substructures, specifically monocyclic, polycyclic, or fused polycyclic $C_{3-12}$ cycloalkyl, $C_{3-12}$ cycloalkenyl, $C_{3-12}$ cycloalkylidenyl, $C_{3-12}$ cycloalkylene, or $C_{3-12}$ cycloalkylenylene groups. In a specific embodiment, L is a $C_{12-42}$ alkylene group comprising two alkyl branches. In a specific embodiment, the compound of formula (10) can be a branched, dimeric $C_{36}$ or $C_{44}$ fatty acid or alcohol. In another embodiment, the compound of formula is a branched or linear $C_{13-18}$ dimeric fatty acid or alcohol. A $C_{36}$ or $C_{44}$ dimeric fatty acid or alcohol must be branched to prevent crystallization of the alkylene or alkenylene chain.

The aliphatic diacid can be a branched chain dicarboxylic acid, and can if desired contain a cyclic group. Specifically, in an embodiment, the aliphatic diacid is a $C_{14-44}$ aliphatic diacid or derivative thereof comprising the formula (11):

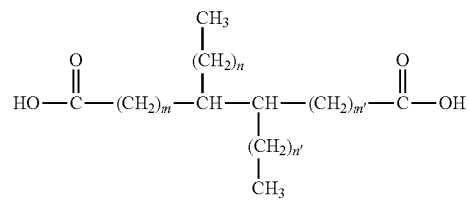

(11)

where m and m' are independently 0 to 38, n and n' are independently 0 to 38, and the sum m'm'+n+n' is an integer from 8 to 38. In a specific embodiment, a $C_{36}$ aliphatic diacid has the structure of formula (11), where m and m' are independently 0 to 30, n and n' are independently 0 to 30, and the sum m'm'+n+n' is 30. In another specific embodiment, a $C_{36}$ aliphatic diacid has the structure of formula (11), where each m and m' is independently 5 to 10, each n and n' is independently 5 to 10, and the sum m+m'+n+n' is 30. In an exemplary embodiment, m and m' are independently 7 or 8, n and n' are independently 7 or 8, and the sum m'm'+n+n' is 30. In a specific embodiment, a $C_{44}$ aliphatic diacid has the structure of formula (11), where m and m' are independently 0 to 30, n and n' are independently 0 to 30, and the sum m+m'+n+n' is 38. In an exemplary embodiment, m and m' are independently 12 or 13, n and n' are independently 6 or 7, and the sum m'm'+n+n' is 38. Such diacids are also referred to generally as dimeric fatty acids, and may be derived from the condensation of readily available biologically-derived feedstocks.

The non-isosorbide aliphatic units derived from a $C_{14-44}$ aliphatic diacid, a $C_{14-44}$ aliphatic diol or combination of these can be present in an amount of 3 to 25 wt %, specifically 4 to 23 wt %, and more specifically 6 to 20 wt %, based on the total weight of dihydroxy compound, polyol and diacid used to make the polycarbonate.

The isosorbide-based copolycarbonate may further comprise carbonate units derived from an aromatic dihydroxy compound (an aromatic unit). Suitable aromatic dihydroxy compounds are the same as those described above with regard to the homopolycarbonate.

The aromatic units can be present in an amount of 10 to 45 wt %, specifically 15 to 40 wt %, and more specifically 19 to 36 wt %, based on the total weight of dihydroxy compound, polyol and diacid used to make the polycarbonate.

The isosorbide-based copolycarbonate may be present in an amount of 20 to 90 wt %, specifically 30 to 80 wt %, and more specifically 35 to 75 wt %, based on the total weight of the composition.

In compositions comprising greater than or equal to 60 weight percent of the homopolycarbonate it can be advantageous to use an isosorbide-based copolycarbonate comprising non-isosorbide aliphatic units derive from a $C_{14-44}$ aliphatic diacid, a $C_{14-44}$ aliphatic diol or combination of these, carbonate units derived from an aromatic dihydroxy compound, aliphatic units derived from an aliphatic oligomer, or combination of the foregoing optional units.

The thermoplastic compositions comprising blends of a homopolycarbonate comprising units derived from an aromatic dihydroxy compound and a copolymer comprising isosorbide units and siloxane units can have a notched Izod impact strength greater than or equal to 100 kJ/m$^2$, specifically, greater than or equal to 105 kJ/m$^2$, or, more specifically, specifically, greater than or equal to 110 kJ/m$^2$. The notched Izod impact strength can be less than or equal to 220 kJ/m$^2$.

Polycarbonates, other than the isosorbide-based polycarbonates disclosed herein, can typically be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions, e.g., about 8 to about 10.

However, as disclosed in U.S. Patent Publication Nos. 20090105393 and 20090105444, JP2009-191226 and JP2009-144013, the isosorbide-based polycarbonate or polyester-polycarbonate can be prepared by a melt polymerization process. Generally, in the melt polymerization process, polycarbonates are prepared by co-reacting, in a molten state, the dihydroxy reactant(s) (i.e., isosorbide, aliphatic diol and/or aliphatic diacid, and any additional dihydroxy compound) and a diaryl carbonate ester, such as diphenyl carbonate, or more specifically in an embodiment, an activated carbonate such as bis(methyl salicyl) carbonate, in the presence of a transesterification catalyst. Volatile monohydric phenol is removed from the molten reactants by distillation and the polymer is isolated as a molten residue. Methods of polymerization are described in greater detail in U.S. Patent Publication Nos. 20090105393 and 20090105444, which are incorporated by reference herein in their entirety.

The thermoplastic composition can have a total bio-content of greater than or equal to 15 wt %, specifically greater than or equal to 25 wt %, more specifically greater than or equal to 40 wt %, and still more specifically greater than or equal to 50 wt %, based on the total weight based on the total weight of the composition exclusive of and prior to addition of any filler. Bio-content can be determined using radiocarbon and isotope ratio mass spectrometry to determine the carbon fraction in a material that is coming from renewable sources (see, for example ASTM D6866-06a).

The thermoplastic composition can further include as an additional polymer an impact modifier(s). Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

The thermoplastic composition can include various additives ordinarily incorporated in resin compositions of this type, with the proviso that the additives are selected so as to not significantly adversely affect the desired properties of the thermoplastic composition. Combinations of additives can be used. Such additives can be mixed at a suitable time during the mixing of the components for forming the composition. Exemplary additives are described in U.S. Patent Publication Nos. 20090105393 and 20090105444.

Thermoplastic compositions comprising the isosorbide-based polycarbonate can be manufactured by various methods. For example, powdered isosorbide-based polycarbonate, homopolycarbonate, and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water bath and pelletized. The pellets, so prepared, when cutting the extrudate can be one-fourth inch long or less as desired. Such pellets can be used for subsequent molding, shaping, or forming.

The homo and copolycarbonates may be used in making various articles including, but not limited to a film, a sheet, an optical wave guide, a display device and a light emitting diode prism. Furthermore the polycarbonates may further be used in making articles such as, exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by automotive, truck, military vehicle, and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desktop computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

The isosorbide-based polycarbonates are further illustrated by the following non-limiting examples.

The polycarbonate compositions in mole percent (mol %) describes the composition of all dihydroxy functional monomers used in making the polycarbonate. This composition corresponds closely to the composition of the resulting polymer as determined by 1H NMR for the majority of the samples. Polycarbonate composition in weight percent (wt %) are approximate and rounded numbers, calculated from the monomer composition in moles.

Isosorbide is abbreviated as IS. Bisphenol A is abbreviated as BPA. Pripol 1009 is a branched fatty acid dimer consisting of 36 carbon atoms. Priplast 3162 is an oligomer of dimerized fatty acids with average molar mass of approximately 1000 grams per mole (g/mol). Priplast 1838 is an oligomer of dimerized fatty acids with average molar mass of approximately 2000 g/mol. PDMS denotes a eugenol endcapped polydimethylsiloxane (PDMS) chain with two aromatic OH groups at its chain ends.

The polycarbonates were made in melt by adding 101-103% of carbonate precursor (bis(methylsalicyl) carbonate (BMSC)) to the total of 100 mol % of dihydroxy and acid functional monomers. A 200 liter stainless steel stirred tank reactor was charged with BMSC, isosorbide, polysiloxane, aliphatic units and optionally BPA. No catalyst was added to the reactor. The reactor was then evacuated and purged with nitrogen three times to remove residual oxygen and then put to a constant pressure of 800 mbar. Then the temperature was increased to 130° C. in order to melt and to dissolve the monomers. The temperature was then reduced to 100° C. The monomer mixture was then pumped to a PFR (plug flow reactor). At the start of the PFR there is continuous addition of an aqueous solution of sodium hydroxide to the monomer mix using a HPLC pump. The PFR is operated at 180° C.-200° C. and a pressure of 4-5 bar. The oligomer out of the PFR is transferred to a flash devolatilisation system.

The flash devolatilization system consists of a pre-heater and a flash vessel. The pre-heater is operated at approximately 240° C. and 200 mbar, the flash vessel is operated at 190° C. and 180 mbar. Under the flash vessel there is a melt pump which transfers the material to the extruder. The extruder was a Werner & Pfleiderer ZSK25WLE 25 mm 13-barrel twin-screw extruder with an L/D=59. The reaction mixture was reactively extruded at a 250-rpm screw speed. The extruder barrels were set to 270° C. and the die was set to 280° C. The extruder was equipped with five forward vacuum vents and one back-vent. The extruder has one vacuum systems called hi-vac, all the vent are connected to this system and have a vacuum of ~1 mbar The methyl salicylate byproduct was removed via devolatilization through these vents. Collected at the end of the extruder through a die were molten strands of polymer that were solidified through a water bath and pelletized.

The polycarbonate was extruded using the conditions described below on a twin screw extruder. During extrusion, 0.02% weight percent of a 45 weight percent H3PO3 solution in water was added to stabilize the polymer and minimize degradation. 0.3 weight percent PETS was added as a mold release agent. Weight percents are based on the total weight of the composition. No other additives and/or colorants were used. Materials were extruded on a twin screw extruder using the following settings:

| | |
|---|---|
| Temperature zone 1 | 50° C. |
| Temperature zone 2 | 200° C. |
| Temperature zone 3 | 250° C. |
| Temperature zone 4 | 270° C. |
| Temperature zone 5 | 280° C. |
| Temperature zone 6 | 280° C. |
| Temperature zone 7 | 280° C. |
| Temperature zone 8 | 280° C. |
| Speed | 300 rpm |
| Vacuum | full |

Molding was done using these settings:

Temperature zone 1: 240° C.

Temperature zone 2: 250° C.

Temperature zone 3: 260° C.

Temperature zone 4: 250° C.

Temperature mold: 60-70° C.

Injection Speed: 35-50 mm/s

After pressure: Between 50 and 70 bars

Drying time: 6 hours at 85° C.

Molding was done using these settings:

Temperature zone 1: 240° C.

Temperature zone 2: 250° C.

Temperature zone 3: 260° C.

Temperature zone 4: 250° C.

Temperature mold: 60-70° C.

Injection Speed: 35-50 mm/s

After pressure: Between 50 and 70 bars

Drying time: 6 hours at 85° C.

Vicat softening temperature was determined according to ISO306 using a heating rate of 120° C./hour and a force of 50 Newtons. Test specimens of 10×10×4 mm were cut from molded 80×10×4 mm ISO impact bars. Each test was repeated and the average of the two results was reported.

Heat deflection temperature was determined according to ISO75:2004 using 1.8 megaPascal (Mpa) stress on the flat surface (method A). Measurements were performed on molded ISO bars (80×10×4 mm) which were preconditioned at 23° C. and 50% relative humidity for 48 hours. The heating medium of the HDT equipment was mineral oil. Measurements were performed in duplo and the average value was reported.

Notched Izod impact was determined according to ISO 180:2000, method A test protocol. The test was repeated five times on 80×10×3 mm molded impact bars which had been notched. The test specimens were conditioned at 23° C. and 50% relative humidity for 48 hours. The impact velocity was 3.5 m/s with a pendulum energy of 5.5 J. The clamping height was 40 mm. The test was conducted at 23° C. Results are reported as the average of the five measurements in the unit kilojoules per square meter. All test specimens broke completely.

The polycarbonates (PC) shown in Table 1 were made as described above and then combined to form the blends shown in Table 2.

TABLE 1

| | Monomer composition in weight percent | | | | | | VICAT softening temp. (°C.) | Heat deflection temp. (°C.) | Tg (DSC) (°C.) |
|---|---|---|---|---|---|---|---|---|---|
| | IS | BPA | PDMS | Priplast 1838 | Priplast 3162 | Pripol 1009 | | | |
| A | 100 | | | | | | 158 | 137 | 169 |
| B | 94 | | 6 | | | | 155 | 135 | 163 |
| C | 89 | | 11 | | | | 157 | 132 | 167 |
| D | 48 | 32 | | | | 20 | 106 | 77 | 118 |
| E | | 100 | | | | | | | |
| F | 78 | | 5 | | 17 | | 128 | 114 | 152 |
| G | 74 | | 10 | | 16 | | 124 | 112 | 154 |
| H | 87 | | 6 | | | 7 | | 122 | 156 |
| I | 77 | | 10 | | | 13 | | 108 | 149 |
| J | 52 | 37 | 11 | | | | 151 | 128 | |
| K | 75 | 20 | 6 | | | | | 128 | 165 |
| L | 60 | 34 | 6 | | | | | 128 | |
| M | 78 | | | 22 | | | 94 | | 165 |

| | Notched ISO impact on 80 × 10 × 3 notched impact bars in kJ/m2 | | | | | | |
|---|---|---|---|---|---|---|---|
| | 23° C. | 10° C. | 0° C. | −10° C. | −20° C. | −30° C. | −40° C. |
| A | 9 | 9 | 8 | 8 | 6 | 6 | 6 |
| B | 19 | 13 | 12 | | 11 | 11 | 10 |
| C | 33 | | 29 | 23 | 18 | | |
| D | 5 | | | | 4 | | |
| E | 70 | | | | 12 | | |
| F | 57 | 48 | 39 | 24 | 20 | 16 | 13 |
| G | 107 | 90 | 77 | 71 | 32 | 19 | 13 |
| H | 14 | 12 | 10 | 11 | 9 | 9 | 7 |
| I | 36 | 22 | 16 | 14 | 13 | 13 | 12 |
| J | 56 | 52 | 46 | 42 | 37 | | 23 |
| K | 26 | 18 | 14 | 12 | | 11 | 11 |
| L | 53 | 32 | 15 | 15 | 14 | 12 | 11 |
| M | 30 | | | | | | |

Blends of the preceding polycarbonates were made by melt blending the polycarbonates. Extrusion and molding were performed using the same settings as for the resins as given above. Compositions and physical properties are shown in Table 2. Amounts of the preceding polycarbonates used to form the blends are expressed in weight percent based on the total weight of the composition. BPA-PDMS (80:20) is a copolymer of bisphenol A and polydimethylsiloxane in a weight ratio of 80:20.

TABLE 2

| | blend composition (% wt) | | | | | | | | | | | | | BPA-PDMS (80:20) | bio content (% w) | VICAT softening temp. (°C.) |
|---|---|---|---|---|---|---|---|---|---|---|---|---|---|---|---|---|
| | A | B | C | D | E | F | G | H | I | J | K | L | M | | | |
| 1* | | | | 65 | | | | | | | | 35 | | | 69 | 113 |
| 2* | | | | 30 | | | | | | | | 70 | | | 79 | 108 |
| 3* | 35 | | | 65 | | | | | | | | | | | 68 | 112 |
| 4* | 70 | | | 30 | | | | | | | | | | | 77 | |
| 5* | | | | 83 | | | | | | | | | | 18 | 49 | 108 |
| 6* | | | | | 83 | | | | | | | | | 18 | 0 | 145 |
| 7* | | | | 65 | | | | | | | | | 35 | | 57 | 130 |
| 8* | | | | 30 | | | | 70 | | | | | | | 74 | 124 |
| 9* | | | | 30 | | | | | | 70 | | | | | 63 | 140 |
| 10* | | | | 30 | 70 | | | | | | | | | | 75 | 113 |
| 11* | | 70 | | 30 | | | | | | | | | | | 73 | 143 |
| 12 | | | | | 30 | 70 | | | | | | | | | 57 | |
| 13 | | 70 | | 5 | 25 | | | | | | | | | | 58 | 145 |
| 14* | | | | 35 | | | | | | | | 65 | | | 54 | |
| 15* | | | | 65 | | | 35 | | | | | | | | 66 | |
| 16* | | | | 65 | | | | 35 | | | | | | | 54 | 118 |
| 17* | | | | 65 | | 35 | | | | | | | | | 66 | 114 |
| 18* | | | 35 | 65 | | | | | | | | | | | 65 | 114 |
| 19 | | | 35 | 5 | 60 | | | | | | | | | | 30 | 142 |

TABLE 2-continued

| | | | | | |
|---|---|---|---|---|---|
| 20 | 65 | 35 | | | 27 |
| 21 | 65 | | 35 | | 16 |
| 22 | 65 | 35 | | | 27 |

| | Heat deflection temp. (°C.) | Notched ISO impact on 80 × 10 × 3 notched impact bars in kJ/m2 | | | | | | |
|---|---|---|---|---|---|---|---|---|
| | | 23° C. | 10° C. | 0° C. | −10° C. | −20° C. | −30° C. | −40° C. |
| 1* | 90 | 8 | 7 | 7 | 7 | 6 | | 5 |
| 2* | 99 | 8 | | 10 | 9 | 9 | 7 | |
| 3* | 95 | 15 | 7 | | 6 | 6 | 6 | 6 |
| 4* | 131 | 10 | 9 | 9 | | | 7 | 5 |
| 5* | 80 | 8 | | | | 6 | | |
| 6* | 121 | 74 | | 71 | 68 | 66 | | |
| 7* | 95 | 7 | 8 | 8 | 7 | 7 | 8 | 6 |
| 8* | 114 | 16 | 13 | 12 | 11 | 11 | 8 | 10 |
| 9* | 124 | 18 | 16 | 14 | 13 | 12 | 10 | 10 |
| 10* | 105 | 48 | 26 | 16 | 14 | 12 | 12 | 4 |
| 11* | 123 | 50 | | 20 | 17 | 14 | | |
| 12 | 112 | 152 | | 159 | | 19 | | 13 |
| 13 | 122 | 197 | | | | 12 | | |
| 14* | 114 | 18 | | | 11 | 10 | 9 | |
| 15* | 87 | 8 | 8 | 8 | 8 | 8 | 8 | 8 |
| 16* | 93 | 10 | 9 | 9 | 9 | 9 | 9 | 6 |
| 17* | 85 | 14 | 9 | 10 | 9 | 7 | | 6 |
| 18* | 85 | 30 | | 14 | 14 | 13 | | |
| 19 | 123 | 72 | | 64 | 62 | 31 | | |
| 20 | 118 | 101 | | 33 | | 20 | | 13 |
| 21 | 127 | 103 | | 73 | | 47 | | 18 |
| 22 | 116 | 154 | | 156 | | 57 | | 55 |

*Comparative Example

Table 2 shows that blends comprising a homopolycarbonate having aromatic units and a copolymer comprising isosorbide units and siloxane units shows an unexpected increase in notched Izod impact strength while maintaining good heat properties. Specifically, a comparison of Examples 12 and 13 to the blend components of Examples 12 and 13 shows that Examples 12 and 13 have an impact strength which is more than double of the impact strength of either one of the composition's components. Examples 20 and 21 have an impact strength that is 47-68% higher than the highest impact strength of a blend component. All the inventive examples have a heat deflection temperature greater than or equal to 112° C.

The singular forms "a," "an," and "the" include plural referents unless the context clearly dictates otherwise. Unless defined otherwise, technical and scientific terms used herein have the same meaning as is commonly understood by one of skill in the art to which this invention belongs. The endpoints of all ranges directed to the same component or property are inclusive and independently combinable (e.g., ranges of "less than or equal to about 25 wt %, or, more specifically, about 5 wt % to about 20 wt %," is inclusive of the endpoints and all intermediate values of the ranges of "about 5 wt % to about 25 wt %," etc.). The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. As used herein, the term "hydrocarbyl" refers broadly to a substituent comprising carbon and hydrogen, optional with at least one heteroatoms, for example, oxygen, nitrogen, halogen, or sulfur; "alkyl" refers to a straight or branched chain monovalent hydrocarbon group; aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group, with benzyl being an exemplary arylalkyl group; "acyl" refers to an alkyl group with the indicated number of carbon atoms attached through a carbonyl carbon bridge (—C(═O)—); "alkoxy" refers to an alkyl group as defined above with the indicated number of carbon atoms attached through an oxygen bridge (—O—); and "aryloxy" refers to an aryl group with the indicated number of carbon atoms attached through an oxygen bridge (—O—). Where used, wavy bonds in structural formulas are included as generally in the art to show single bonds with unspecified stereochemistry. "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A thermoplastic composition comprising a homopolycarbonate comprising units derived from an aromatic dihydroxy compound and a copolycarbonate comprising isosorbide units and siloxane units, wherein the homopolycarbonate is present in an amount of 10 to 80 weight percent, based on the total weight of composition, and wherein the isosorbide units in the copolycarbonate are present in an amount of 50 to 95 weight percent, based on a total weight of diol and diacid used to make the copolycarbonate, wherein the copolycarbonate is present in an amount of 20 to 90 wt %, based on the total weight of the composition.

2. The thermoplastic composition of claim 1 wherein the copolycarbonate comprising isosorbide units and siloxane units further comprises non-isosorbide aliphatic units derived from a $C_{14\text{-}44}$ aliphatic diacid, a $C_{14\text{-}44}$ aliphatic diol or combination of these.

3. The thermoplastic composition of claim 1 wherein the copolycarbonate comprising isosorbide units and siloxane units further comprises aliphatic units derived from an oligomer having a weight average molecular weight of 900 to 4000.

4. The thermoplastic composition of claim 1 wherein the copolycarbonate comprising isosorbide units and siloxane units further comprises units derived from an aromatic dihydroxy compound.

5. The thermoplastic composition of claim 1 wherein the homopolycarbonate is a bisphenol A homopolycarbonate.

6. The thermoplastic composition of claim 1, wherein the homopolycarbonate is present in an amount of 20 to 70 weight percent, based on the total weight of composition.

7. The thermoplastic composition of claim 1, wherein the isosorbide units in the copolycarbonate are present in an amount of 60 to 95 weight percent, based on a total weight of diol and diacid used to make the copolycarbonate.

8. The thermoplastic composition of claim 1, wherein the siloxane units in the copolycarbonate are present in an amount of 3 to 30 weight percent, based on a total weight of diol and diacid used to make the copolycarbonate.

9. The thermoplastic composition of claim 1, wherein the composition has a total bio-content of greater than or equal to 15 wt % based on the total weight of the composition exclusive of and prior to addition of any filler.

10. The thermoplastic composition of claim 1, wherein the copolycarbonate is present in an amount of 30 to 80 wt %, based on the total weight of the composition.

11. A thermoplastic composition comprising a homopolycarbonate comprising units derived from an aromatic dihydroxy compound and a copolycarbonate comprising isosorbide units, siloxane units and at least one additional unit selected from the group consisting of aliphatic units derived from an oligomer having a weight average molecular weight of 900 to 4000, units derived from an aromatic dihydroxy compound, non-isosorbide aliphatic units derived from a $C_{14\text{-}44}$ aliphatic diacid, and non-isosorbide aliphatic units derived from a $C_{14\text{-}44}$ aliphatic diol, wherein the homopolycarbonate is present in an amount of 10 to 80 weight percent, based on the total weight of composition, and wherein the isosorbide units in the copolycarbonate are present in an amount of 50 to 95 weight percent, based on a total weight of diol and diacid used to make the copolycarbonate, wherein the copolycarbonate is present in an amount of 20 to 90 wt %, based on the total weight of the composition.

12. The thermoplastic composition of claim 11, wherein the homopolycarbonate is a bisphenol A homopolycarbonate.

13. The thermoplastic composition of claim 11, wherein the homopolycarbonate is present in an amount of 20 to 70 weight percent, based on the total weight of composition.

14. The thermoplastic composition of claim 11, wherein the isosorbide units in the copolycarbonate are present in an amount of 60 to 95 weight percent, based on a total weight of diol and diacid used to make the copolycarbonate.

15. The thermoplastic composition of claim 11, wherein the siloxane units in the copolycarbonate are present in an amount of 3 to 30 weight percent, based on a total weight of diol and diacid used to make the copolycarbonate.

16. The thermoplastic composition of claim 11, wherein the composition has a total bio-content of greater than or equal to 15 wt % based on the total weight of the composition exclusive of and prior to addition of any filler.

17. The thermoplastic composition of claim 11, wherein the copolycarbonate is present in an amount of 30 to 80 wt %, based on the total weight of the composition.

18. The thermoplastic composition of claim 11, wherein the composition has a notched Izod impact strength at 23° C. of greater than or equal to 100 kJ/m$^2$.

19. The thermoplastic composition of claim 11, wherein the siloxane unit comprises polydimethylsiloxane.

20. The thermoplastic composition of claim 1, wherein the siloxane unit comprises polydimethylsiloxane.

21. A thermoplastic composition comprising a homopolycarbonate comprising units derived from an aromatic dihydroxy compound and a copolycarbonate comprising isosorbide units and siloxane units, wherein the homopolycarbonate is present in an amount of 25 to 65 weight percent, based on the total weight of composition, wherein the composition has a total bio-content of greater than or equal to 15 wt % based on the total weight of the composition exclusive of and prior to addition of any filler, wherein the heat deflection temperature greater than or equal to 112° C., wherein the impact strength of the thermoplastic composition is greater than the impact strength of the homopolycarbonate and of the copolycarbonate.

* * * * *